United States Patent
Koriyama

[11] Patent Number: 5,805,385
[45] Date of Patent: Sep. 8, 1998

[54] MAGNETIC DISK DEVICE

[75] Inventor: Hiroshi Koriyama, Tokyo, Japan

[73] Assignee: NEC Corporation, Tokyo, Japan

[21] Appl. No.: 409,587

[22] Filed: Mar. 24, 1995

Related U.S. Application Data

[62] Division of Ser. No. 251,219, May 31, 1994, abandoned.

[30] Foreign Application Priority Data

| May 28, 1993 | [JP] | Japan | 5-151087 |
| May 28, 1993 | [JP] | Japan | 5-151088 |

[51] Int. Cl.⁶ ..................................................... G11B 5/55
[52] U.S. Cl. ............................................................. 360/106
[58] Field of Search ..................................... 360/104–106, 360/97.01–97.03, 98.01

[56] References Cited

U.S. PATENT DOCUMENTS

| 4,754,353 | 6/1988 | Levy | 360/106 |
| 5,050,026 | 9/1991 | Goss | 360/106 |
| 5,161,077 | 11/1992 | Jabbari | 360/106 |
| 5,247,410 | 9/1993 | Ebihara et al. | 360/106 |
| 5,251,085 | 10/1993 | Morris et al. | 360/106 |
| 5,301,078 | 4/1994 | Makino et al. | 360/106 |
| 5,446,608 | 8/1995 | Sanada | 360/97.02 |
| 5,463,515 | 10/1995 | Koriyama | 360/98.01 |
| 5,469,315 | 11/1995 | Sanada | 360/106 |
| 5,473,489 | 12/1995 | Sanada | 360/106 |
| 5,510,940 | 4/1996 | Tacklind et al. | 360/106 |
| 5,539,597 | 7/1996 | Blanks | 360/106 |
| 5,602,701 | 2/1997 | Komura et al. | 360/106 |

FOREIGN PATENT DOCUMENTS

| 1-229470 | 9/1989 | Japan | 360/106 |
| 1607004 | 11/1990 | U.S.S.R. | 360/106 |
| 8907309 | 8/1989 | WIPO | 360/106 |

*Primary Examiner*—Allen T. Cao
*Attorney, Agent, or Firm*—Sughrue, Mion, Zinn, Macpeak, & Seas, PLLC

[57] ABSTRACT

A magnetic disk device has a spindle shaft rotatably supported by bearings, a plurality of magnetic disks directly mounted on an outer peripheral side of the spindle shaft and being stacked in an axial direction of the spindle shaft, a plurality of spacer rings directly mounted on the outer peripheral side of the spindle shaft and respectively interposed between the plurality of magnetic disks, and a clamp ring mounted on the top of the spindle shaft for tightly fixing the plurality of magnetic disks and the plurality of spacer rings to the spindle shaft. The device also has a center shaft provided with inner race members which are in contact with inner peripheral surfaces of bearings, an arm holder including a cylinder member formed in a center portion thereof and arm members connected at one end portion to magnetic heads corresponding to respective magnetic disks and at another end portion to the outer peripheral side of the cylinder member. A cylindrical support member is directly in contact with outer peripheral surfaces of the bearings and fixed to the arm holder at both end portions thereof by an arm clamp ring with a prescribed small gap formed between an outer peripheral surface thereof and an inner peripheral surface of the cylinder member of the arm holder and rotatably supported on the center shaft. A voice coil motor reciprocates the magnetic heads along the radial direction of the magnetic disks by the arm holder.

4 Claims, 6 Drawing Sheets

MAGNETIC DISK DEVICE

This is a divisional of application Ser. No. 08/251,219 filed May 31, 1994, now abandoned.

BACKGROUND OF THE INVENTION

1. Field of the Invention

The present invention relates to a magnetic disk device, and more particularly to a magnetic disk device having a spindle shaft for rotatably supporting magnetic disks and a positioner for positioning magnetic heads which respectively correspond to the magnetic disks.

2. Description of the Related Art

In a conventional magnetic disk device, magnetic heads are mounted on a rotary type carriage and floated over the magnetic disks with a small distance therebetween due to air pressure produced by high speed rotation of the magnetic disks. In this state read and write operations of magnetic heads to/from the magnetic disks are performed. The rotary type carriage is positioned, by reading servo information written in the magnetic disks, by means of a servo head. It is desirable to improve such a magnetic disk device by increasing a recording density thereof. In order to increase recording density, it is generally known to increase the bit density of tracks of the magnetic disks and/or to increase the track density by reducing the track widths. It is known to utilize track widths of 10 μm or less.

Referring to FIG. 1, a spindle structure of conventional magnetic disk device has a plurality of magnetic disks 101 stacked on and supported by a spindle hub 104, which includes aluminum-based materials, fitted on a spindle shaft 102 which includes iron-based materials. The spindle shaft 102 is rotatably supported on a base plate 103 through bearings 105a and 105b, so that the magnetic disks 101 are rotatable. Spacer rings 106 are provided between adjacent magnetic disks 101 on the spindle hub 104, respectively. The magnetic disks 101 and the spacer rings 106 are secured to the spindle shaft 102 by a clamp ring 107 fitted on an upper end of the spindle shaft 102.

Referring to FIG. 2, a conventional positioner structure has a configuration in which magnetic heads 200 corresponding to the magnetic disks 201 are supported by an arm holder 202 at one end portion of the arm holder 202. The arm holder 202 has a cylindrical member in its center portion and is rotatably supported by a head rotary shaft 203 through bearings 204a and 204b. The magnetic heads 200 supported by the arm holder 202 are reciprocated with respect to the magnetic disks 201 by torque generated by a voice coil motor 207 in a known manner. The magnetic heads 200 are composed of at least one servo head 200a for positioning purposes and a plurality of data heads 200b for reading and writing data and each arm holder 202 has at least one servo arm 202a and at least one data arm 202b corresponding to the magnetic heads 200a and 200b.

In the spindle structure of the conventional magnetic disk device described above, deformation of the spindle hub 104 readily occurs due to the stress generated during the fitting of the spindle hub 104 on the spindle shaft 102 by means of adhesion or force insertion because the spindle shaft 102 is rotatably supported by the base plate 103 through the bearings 105a and 105b which are fitted in the base plate 103. The spindle hub 104 is fitted on the spindle shaft 102 by adhesion force insertion or a shrink fit and the magnetic disks 101 and the space rings 106 are alternately fitted on the spindle hub 104 and fixed thereto by screwing the clamp ring 107. Furthermore, due to thermal stresses caused by a difference in linear expansion coefficients between the spindle hub 104 and the spindle shaft 102, the spindle hub 104 can be deformed when ambient temperature and temperature inside the magnetic disk device are changed during operation. Thus the magnetic disks 101 stacked along the axis of the spindle shaft 102 are considerably deformed due to thermal changes. Therefore, the gap distance between the magnetic disks 101 and the magnetic heads 108 which float with respect to the magnetic disks 101 may become too small. This prevents the gap distance from being set to a value which is small as possible. Moreover, if such small distance were achieved between the magnetic heads 108 and the magnetic disks 101, the possibility of collision of the magnetic heads 108 with the magnetic disks 101 would be increased remarkably and, in the worst case, a head crash may occur, causing data write and read operations to fail. Further, with the shrink fit, force insertion or adhesion in assembling the bearings 105a and 105b and the spindle shaft 102, the bearings 105a and 105b are subjected to stress, causing rotational accuracy of the bearings 105a and 105b to be degraded. In this case, the magnetic disks 101 may be vibrated when rotated, causing problems, such as a head crash, to occur.

In the positioner structure of conventional magnetic disk device, the arm holder 202, which is supported by bearings 204a and 204b, swings at high speed about the head rotary shaft 203 by force generated by the voice coil motor 207. The arm holder 202 may be easily deformed due to the fact that the arm holder 202 and the bearings 204a and 204b are assembled by a tight-fitting, force insertion or shrink fit operation and thus the relative height of the servo arm 202a and data arms 202b of the arm holder 202 to the magnetic disks 201 may change over time. When this change occurs, the amount of floatation of the magnetic heads 40 and an error in data read or write may occur. In the worst case, a head crash occurs. Furthermore, the arm holder 202 may be deformed by thermal stress due to the difference in linear expansion coefficient between the arm holder 202 and the bearings 204 when ambient temperature and temperature inside the magnetic disk device change. Hence the magnetic heads 40 may deviate in position, causing a thermal off-track situation to occur which leads to the inability to properly read data.

SUMMARY OF TITLE INVENTION

It is therefore an object of the present invention to eliminate the above-mentioned disadvantages and provide a magnetic disk device which reduces vibration and/or deformation of magnetic disks which may be caused by assembling operations of parts around a spindle shaft, or by temperature change, when the magnetic disk device is driven so that the possibility of contact between the magnetic heads and the magnetic disks is reduced to thereby realize a high precision recording and reproducing device.

It is another object of the present invention to eliminate the above-mentioned disadvantages and provide a magnetic disk device which is durable and effectively eliminates the deformation of the arm holder over time and reduces the occurrence of positional deviation of the magnetic heads, and thus head crashes.

According to the present invention, a magnetic disk device has:

a spindle shaft rotatably supported by bearings;

a plurality of magnetic disks directly mounted on an outer peripheral side of the spindle shaft and stacked in an axial direction of the spindle shaft;

a plurality of spacer rings directly mounted on the outer peripheral side of the spindle shaft and respectively interposed between the plurality of magnetic disks; and a clamp ring mounted on the top of the spindle shaft for tightly fixing the plurality of magnetic disks and the plurality of spacer rings to the spindle shaft.

Furthermore, according to the present invention, a magnetic disk device has:

a center shaft provided with inner race members which are in contact with inner peripheral surfaces of bearings;

an arm holder including a cylinder member formed in a center portion thereof and arm members connected at one end portion thereof to magnetic heads corresponding to respective magnetic disks and at another end portion thereof to the outer peripheral side of the cylinder member; and a cylindrical support member being directly in contact with outer peripheral surfaces of the bearings and fixed to the arm holder at both end portions thereof by an arm clamp ring with a prescribed small gap formed between an outer peripheral surface thereof and an inner peripheral surface of the cylinder member of the arm holder, the support member being rotatably supported on the center shaft.

BRIEF DESCRIPTION OF THE DRAWINGS

The above objects and features of this invention will become more apparent from the following detailed description when taken in conjunction with the attached drawings in which like reference numerals denote similar elements.

DESCRIPTION OF THE PREFERRED EMBODIMENTS

Figure 1:
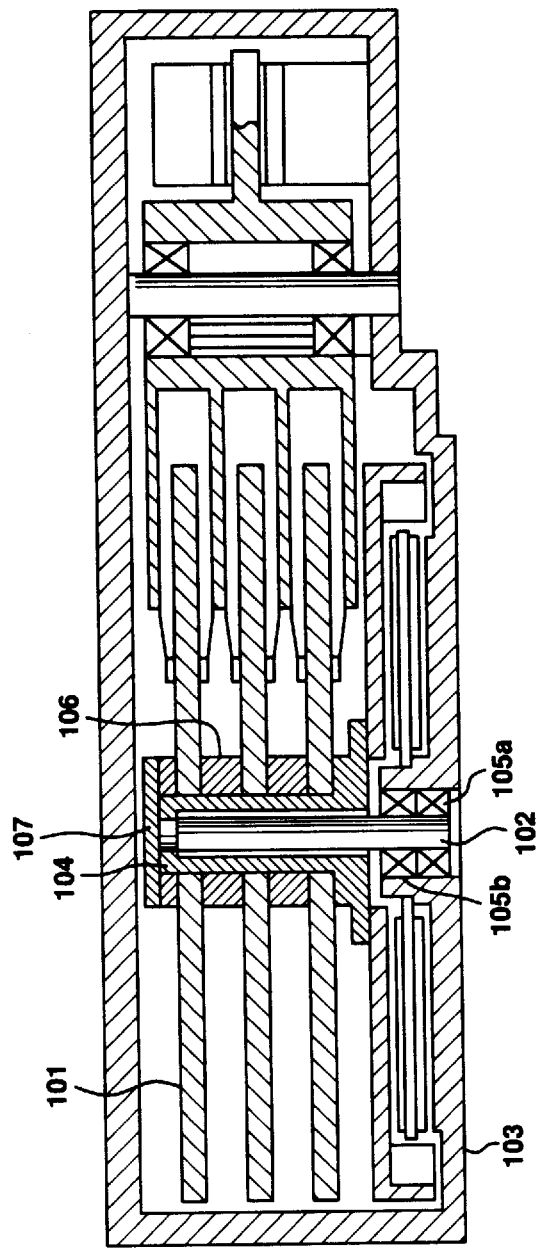
FIG. 1 is a cross-sectional view of a spindle structure of a conventional magnetic disk device.
Figure 2:
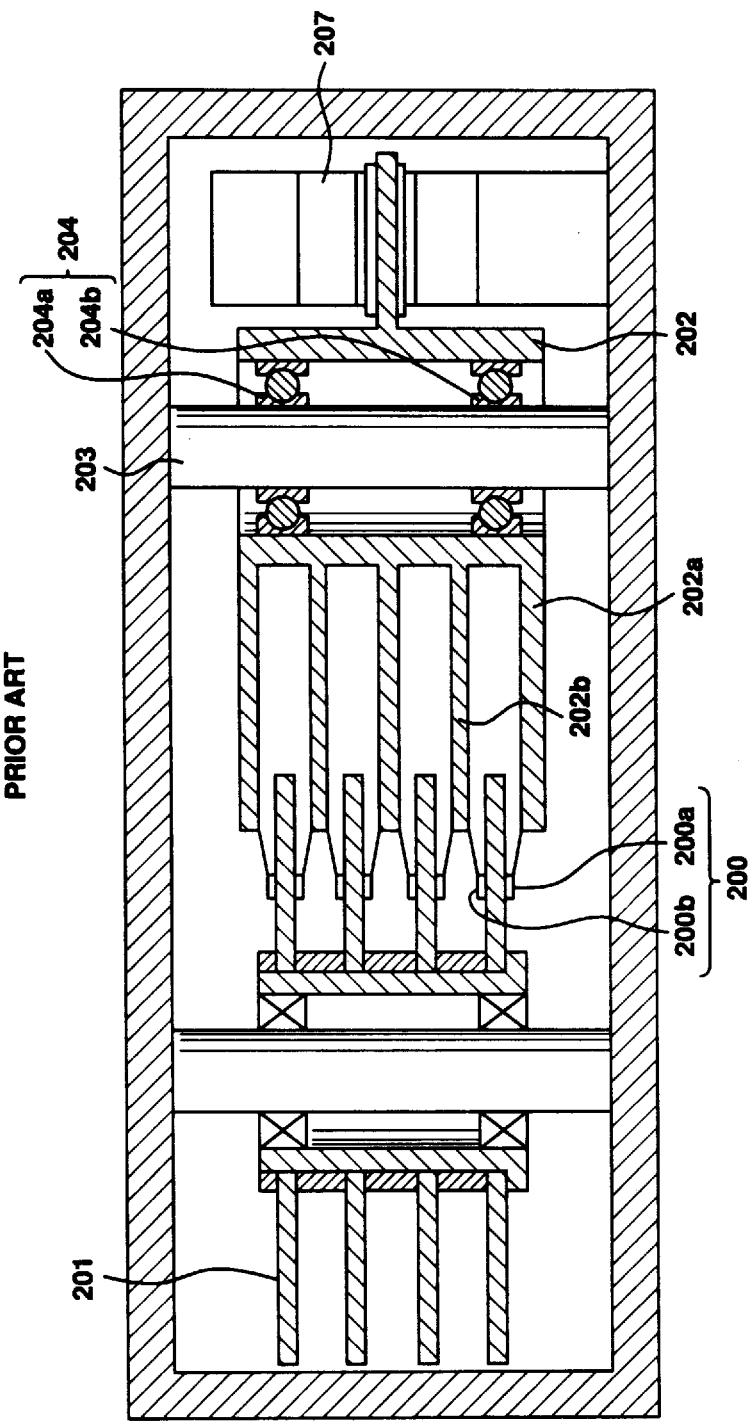
FIG. 2 is a cross-sectional view of a positional structure of a conventional magnetic disk device.
Figure 3:
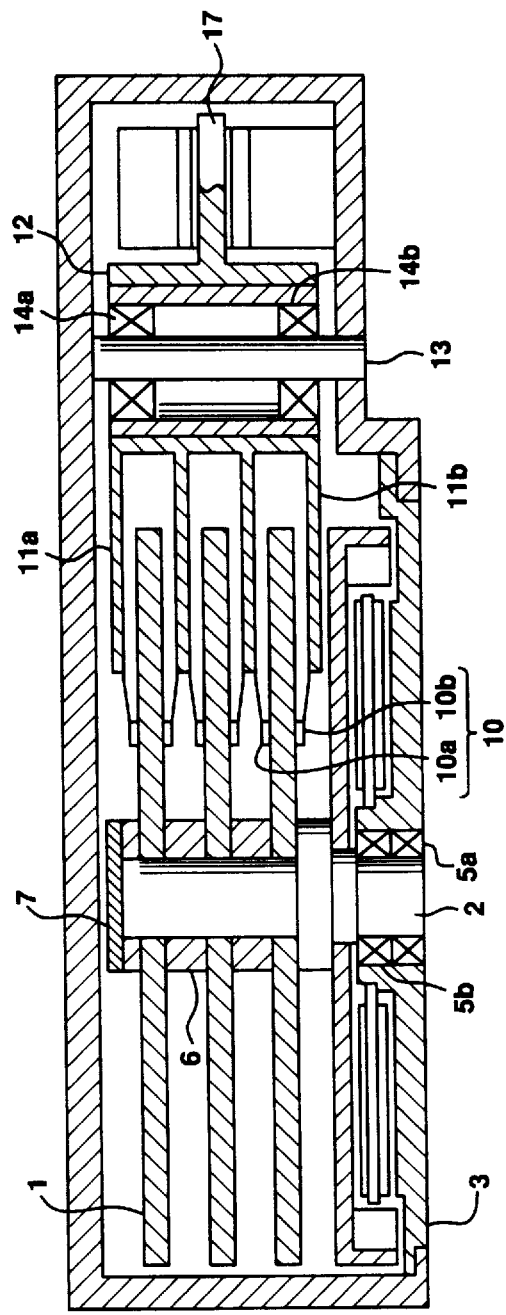
FIG. 3 is a cross-sectional view of a first preferred embodiment of a magnetic disk device according to the present invention.

Referring to FIG. 3, a first embodiment of a magnetic disk device of the present invention has a spindle shaft 2 rotatably supported by bearings 5a and 5b. A plurality of magnetic disks 1 are directly mounted on an outer peripheral side of the spindle shaft 2 and stacked in an axial direction of the spindle shaft 2. A plurality of spacer rings 6 are also directly mounted on the outer peripheral side of the spindle shaft 2 and respectively interposed between the plurality of magnetic disks 1. A clamp ring 7 is mounted on the top of the spindle shaft 2 for tightly fixing the plurality of magnetic disks 1 and the plurality of spacer rings 6 to the spindle shaft 2.

The spindle shaft 2 is rotatably supported at one end of the thereof in a base plate 3 by bearings 5a and 5b. Magnetic disks 1 and spacer rings 6 are directly stacked alternately on the spindle shaft 2 in an axial direction. The magnetic disks 1 and the spacer rings 6 are also tightly fixed to the spindle shaft 2 due to an elastic force of the clamp ring 7.

For example, the spindle shaft 2 may be made of SUS440C or SUS420J2. These materials have linear expansion coefficients which are approximately $10 \times 10^{-6}$ [1/deg] and $12 \times 10^{-6}$ [1/deg], respectively. On the other hand, the magnetic disks 1 may be made of aluminum, chemical tempered glass, ceramic glass or crystallized glass. These materials have linear expansion coefficients which are approximately $24.2 \times 10^{-6}$ [1/deg], $7.7 \times 10^{-6}$ [1/deg], $7.0 \times 10^{-6}$ [1/deg] and $12 \times 10^{-6}$ [1/deg]. In this case, the spindle shaft 2 is preferably made of a material having a linear expansion coefficient which is substantially the same as that of a material of which the magnetic disks 1 are made, i.e., will not cause deformation during expected temperature changes. Also, the various components could be made of the same materials.

In addition, the magnetic heads 10 which are arranged correspondingly to the magnetic disks 1 are supported by an arm holder 12 which is rotatably supported by a head rotation shaft 13 through bearings 14a and 14b. The arm holder 12 is rotatable due to torque generated by a voice coil motor 17, so that the magnetic heads 9 can be rotated thereby. Each magnetic head 10 includes a servo head 10a for positioning purposes and a data head 10b for reading and writing data. The servo head 10a and the data head 10b are respectively mounted on one end portion of a servo arm 11a and a data arm 11b which respectively protrude outwardly from the arm holder 12.

According to the first embodiment of the present invention, since the magnetic disks 1 and the spacer rings 6 are directly stacked and fixed to the spindle shaft 2 due to the elastic force of the clamp ring 7 without adhering or forcibly inserting the conventional spindle shaft, which includes iron-based materials, to the conventional spindle hub, which includes aluminum-based materials, strains generated by the assembling operation and the deformation of the magnetic disks 1 in the horizontal direction due to the difference of linear expansion coefficient between the conventional spindle shaft and the conventional spindle hub are completely eliminated. Therefore, the flatness of the magnetic disks 1 is not degraded as long as the machining accuracy of the spindle shaft 2 is maintained.

Moreover, since the magnetic disks 1 and the spindle shaft 2 are made of materials having substantially the same linear expansion coefficients, it is possible to prevent the radial deviation of the magnetic disks 1 due to thermal stress produced by varying ambient temperature and temperature inside magnetic disk device. Thus, it is possible to prevent the eccentric rotation of the magnetic disks 1 or data errors during reading from the magnetic disks 1 due to partial reduction of a signal level of the data written on the magnetic disks 1.

Figure 4:
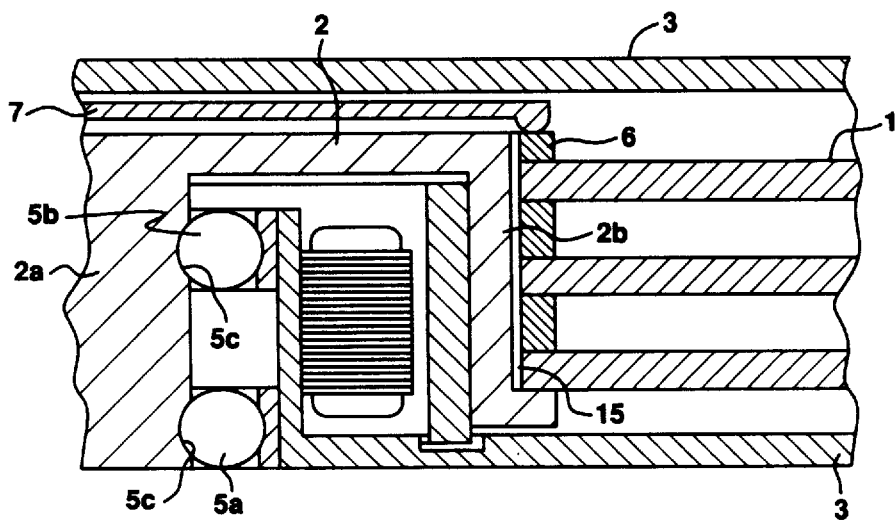
FIG. 4 is an expanded fragmentary sectional view of a second preferred embodiment of the magnetic disk device according to the present invention.

Referring to FIG. 4, a second embodiment of a magnetic disk device of the present invention has a spindle shaft 2 including an inner cylinder member 2a which has inner races 5c formed directly therein for bearings 5a and 5b and is thus rotatably supported by the bearings 5a and 5b and an outer cylinder member 2b of the spindle shaft 2. A plurality of magnetic disks 1 are directly mounted on the outer cylinder member 2b of the spindle shaft 2, with a prescribed small gap defined therebetween in a radial direction of the spindle shaft 2, and are stacked in an axial direction of the spindle shaft 2. A plurality of spacer rings 6 are directly mounted on the outer cylinder member 2b of the spindle shaft 2 with the prescribed small gap defined therebetween and respectively interposed between the plurality of magnetic disks 1. A clamp ring 7 is mounted on the top of the spindle shaft 2 for tightly fixing the plurality of magnetic disks 1 and spacer rings 6 to the outer cylinder member 2b of the spindle shaft 2. Elements of this embodiment which are not illustrated are similar to the first embodiment.

Figure 5:
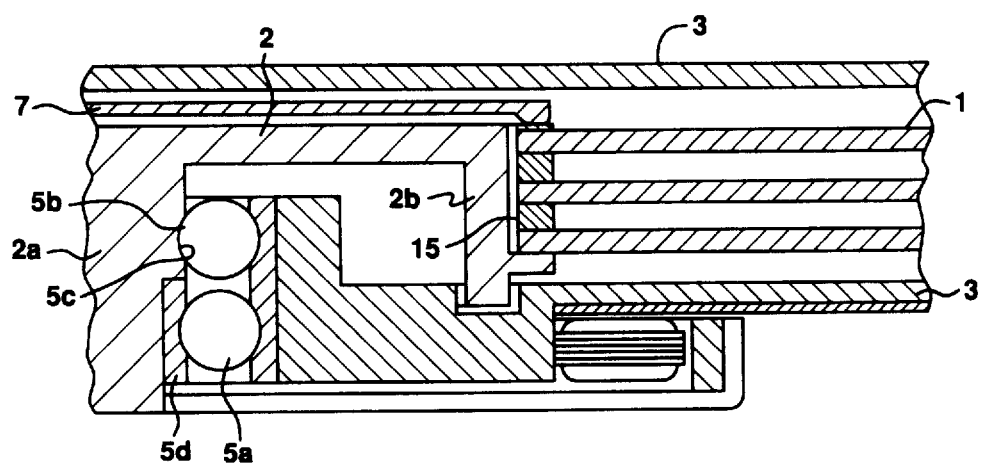
FIG. 5 is an expanded fragmentary sectional view of a third preferred embodiment of the magnetic disk device according to the present invention.

Referring to FIG. 5, which illustrates a third embodiment, the inner cylinder member 2a of the spindle shaft 2 has one inner race 5c formed thereon for bearing 5b. Separate race member 5d is provided for bearing 5a. Other elements of this embodiment are similar to the embodiments described above.

Magnetic disks 1 and spacer rings 6 are directly mounted on the outer cylinder member 2b of the spindle shaft 2, with a prescribed small gap defined therebetween in a radial direction of the spindle shaft 2, and stacked alternately on the outer cylinder member 2b of the spindle shaft 2 in an axial direction of the spindle shaft 2. The magnetic disks 1 and the spacer rings 6 are also tightly fixed to the outer cylinder member 2b of the spindle shaft 2 due to the elastic force of the clamp ring 7.

According to the second embodiment of the present invention, since the magnetic disks 1 and the spacer rings 6 are directly mounted on the outer cylinder member 2b of the spindle shaft 2 with the prescribed small gaps defined therebetween in the radial direction, it is possible to reduce the radial deviation of the magnetic disks 1 due to thermal stress generated by varying ambient temperature and temperature inside magnetic disk device.

Furthermore, due to the fact that the inner races 5c of the bearings 5a and 5b which rotatably support the inner cylinder member 2a of the spindle shaft 2 are formed directly with an outer peripheral surface of the inner cylinder member 2a of the spindle shaft 2, it is possible to prevent strain by an assembling operation of the bearings 5a and 5b by means of the adhesion or force fit and thus reduce the eccentric rotational vibration of the magnetic disks 1.

Figure 6:
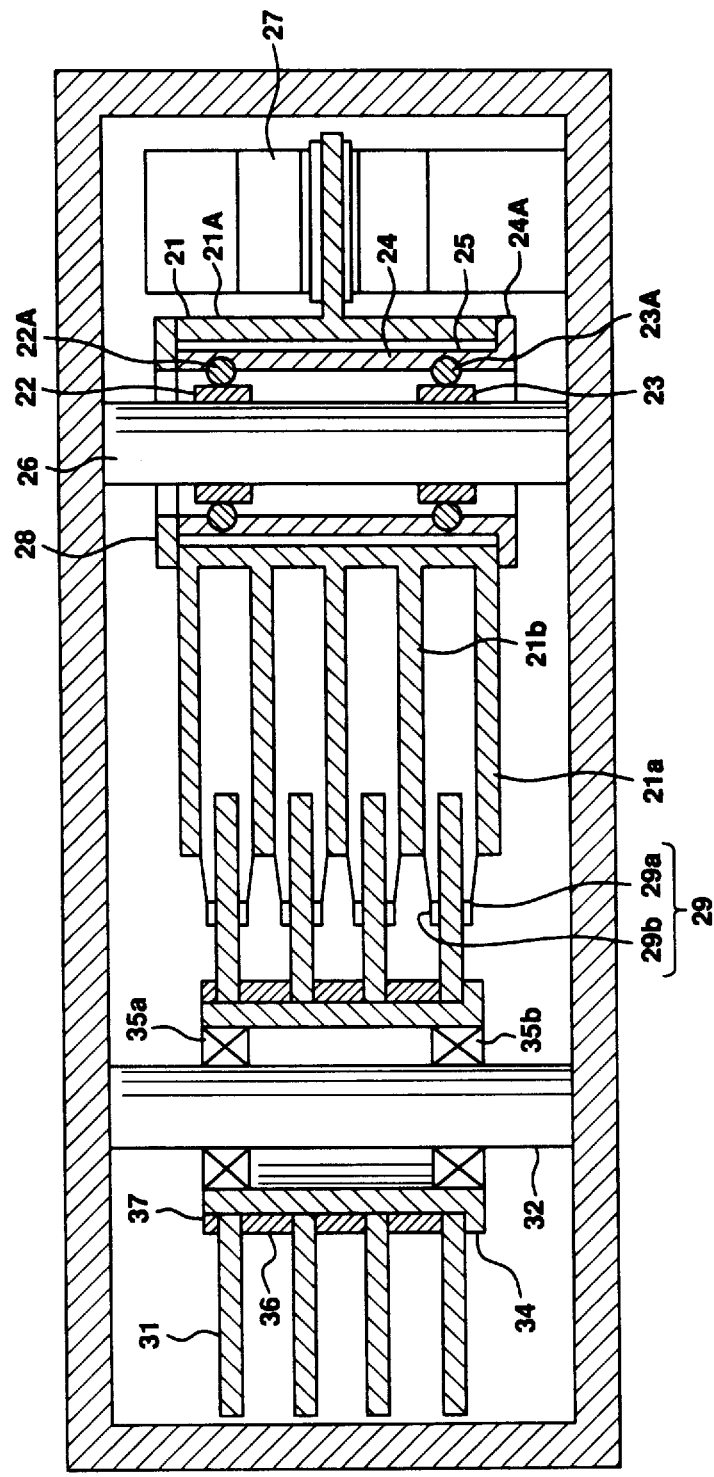
FIG. 6 is a cross-sectional view of a fourth preferred embodiment of a magnetic disk device according to the present invention.

Referring to FIG. 6, a fourth embodiment of a magnetic disk device of the present invention has a center shaft 26 provided with inner race members 22 and 23 which are in contact with balls 22A and 23A. An arm holder 21 includes a cylinder member 21A and arm members 21a and 21b having magnetic heads 29, corresponding to respective magnetic disks 31, at one end and coupled to the outer peripheral side of the cylinder member 21A at the other end. A cylindrical support member 24 is directly in contact with the balls 22A and 23A and is fixed to the arm holder 21 at both end portions thereof by an arm clamp ring 28 with a prescribed small gap 25 formed between an outer peripheral surface thereof and an inner peripheral surface of the cylinder member 21A of the arm holder 21. The arm holder 21 is thus rotatably supported by a bearing consisting of the inner race members 22, 23, the balls 22A, 23A and the cylindrical support member 24, as shown in FIG. 6. A voice coil motor 27 serves to reciprocate the magnetic heads 29 along the radial direction of the magnetic disks 31 by pivoting the arm holder 21.

The magnetic disks 31 and spacer rings 36 are stacked alternately on an outer peripheral side of a spindle hub 34 in an axial direction of a spindle shaft 32. The spindle hub 34 is rotatably supported on the spindle shaft 32 by bearings 35a and 35b. The magnetic disks 31 and the spacer rings 6 are fixed to the spindle hub 34 due to elastic force of a clamp ring 37.

The cylindrical support member 24 has a flange member 24A at a lower end portion thereof against which the cylinder member 21A of the arm holder 21 is held by the arm clamp ring 28. In this case, the cylindrical support member 24 may be made of SUS440C or SUS420J2. These materials have linear expansion coefficients which are approximately $10 \times 10^{-6}$ C[1/deg] and $12 \times 10^{-6}$ [1/deg], respectively. On the other hand, the arm holder 21 may be made of aluminum diecasting, aluminum alloy, SUS304, sintering iron, or ceramic. These materials have linear expansion coefficients which are approximately $17.8–25.0 \times 10^{-6}$ [1/deg], $23.0 \times 10^{-6}$ [1/deg], $17.3 \times 10^{-6}$ [1/deg], $11.0 \times 10^{-6}$ [1/deg], and $12.0 \times 10^{-6}$ [1/deg].

Assuming a diameter of the cylindrical support member 24 is D, the linear expansion coefficient of the cylindrical support member 24 is $\alpha 1$, the linear expansion coefficient of the arm holder 21 is $\alpha 2$ and an amount of temperature change in the magnetic disk device including ambient temperature change is $\Delta T$, the $\Delta d$ is preferably set larger than the value measured by a following equation. Where $\Delta d$ is the gap 25 (see FIG. 6) defined between the outer peripheral surface of the cylindrical support member 24 and the inner peripheral surface of the cylinder member 21A of the arm holder 21.

$$\Delta d = |\alpha 2 - \alpha 1| \times D \times \Delta T,$$

where the symbol | | defines the absolute value. For a magnetic disk device having 3.5 inch magnetic disks, $\Delta d$ is usually set to the value about 100 through 200 [$\mu$m] regarding a margin, although it is empirically adequate at about 20 [$\mu$m].

According to the fourth embodiment of the present invention, since the cylindrical support member 24 is directly in contact with the balls 22A and 23A and fixed to the arm holder 21 at both end portions thereof by an arm clamp ring 28 with a prescribed small gap 25 formed between an outer peripheral surface thereof and an inner peripheral surface of the cylinder member 21A, without directly adhering or forcibly inserting the arm holder 21, it is therefore possible to substantially reduce assembling strains which may occur between the the balls 22A and 23A and the inner peripheral surface of the arm holder 21. Also, deformation of the arm holder 21 itself, due to the difference of linear expansion coefficients between the balls 22A and 23A and the arm holder 21, is reduced, so that any variation of flotation of the magnetic heads 29 can be reduced and thus the positional deviation of the magnetic heads 29, and thus head crashes, can be prevented.

Figure 7:
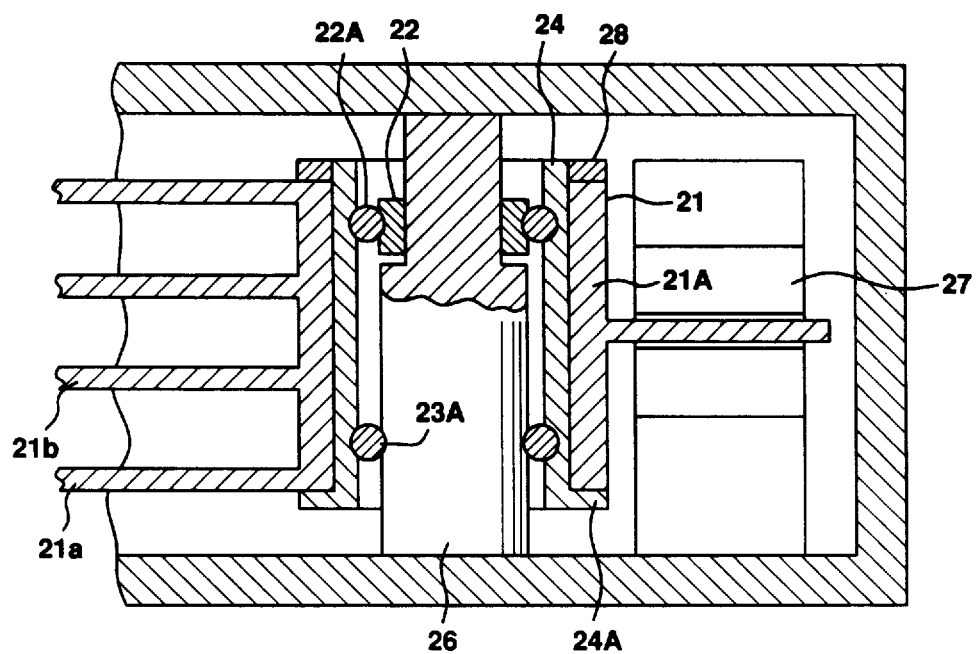
FIG. 7 is an expanded fragmentary sectional view of a fifth preferred embodiment of the magnetic disk device of the present invention.

Referring to FIG. 7, a fifth embodiment of the present invention has a center shaft 26 provided having an inner race member 22 formed thereon which is in contact with balls 22A and a groove formed in the peripheral side thereof for directly coming into contact with the balls 23A. An arm holder 21 is formed of a material having a prescribed linear expansion coefficient and includes a cylinder member 21A formed in a center portion thereof and arm members 21a and 21b having magnetic heads 29 at one end thereof and being connected to the outer peripheral side of the cylinder member 21A of the other end thereof. A cylindrical support member 24, made of a material with a linear expansion coefficient which is substantially similar to that of the arm holder 21, directly in contact with the balls 22A and 23A and is fixed to the arm holder 21 at both end portions thereof by an arm clamp ring 28. Accordingly, the arm holder 21 is rotatably supported by two bearings. As shown in FIG. 7, one of the two bearings consists of the inner race member 22, the balls 22A and a groove of the cylindrical support member 24. The other of the two bearings consists of the groove of the center shaft 26, the balls 23A and a groove of the cylindrical support member 24.

A voice coil motor 27 reciprocates the magnetic heads 29 along the radial direction of the magnetic disks 31 by rotating the arm holder 21. In this embodiment, since the cylindrical support member 24 is made of a material having a linear expansion coefficient which is substantially similar to that of a material of which the arm holder 21 is made, it is not necessary to form a gap between the arm holder 21 and the cylindrical support member 24. Other elements are similar to the embodiments described above.

According to the fifth embodiment of the present invention, the cylindrical support member 24 is made of a material having a linear expansion coefficient which is substantially similar to that of a material of which the arm holder 21 is made. Therefore, it is possible to substantially reduce thermal stresses between the balls 22A and 23A and the inner peripheral surface of the arm holder 21 or the deformation of the arm holder 21 itself due to the difference of linear expansion coefficients between the balls 22A and 23A and the arm holder 21. Accordingly, variation of flotation of the magnetic heads 29 can be substantially reduced and thus the positional deviation of the magnetic heads 29, and the problem of head crash, can be substantially prevented. Furthermore, due to the fact that the center shaft 26 has the groove formed on the peripheral side thereof for directly coming into contact with the ball 23A, it is possible to omit the inner race member 23, so that the number of elements which are necessary to make the magnetic disk device can be minimized. Of course, it is also possible to omit the inner race member 22, if a groove is formed on the peripheral side of the center shaft 26 at a position where the ball 22A is in contact with the inner race member 22.

It will be understood that the above-described embodiments of the invention may be alternatively employed or employed in combination.

The specific materials discussed above are only examples of acceptable materials. Of course, other appropriate materials may be used. The terminology corresponds to the Japan Industrial Standard (JIS) which is well known. SUS440C and SUS420J2 are classified as martensite, and SUS304 is classified as austenite.

SUS440C is made by annealing at 800°–920° C., quenching at 1010°–1070° C. and tempering at 100°–180° C. and by including the chemical components of carbon of 0.95–1.20%, silicon of below 1.00%, manganese of below 1.00%, phosphorus of below 0.04%, sulphur of below 0.03%, nickel of below 0.60%, chromium of 16.0–18.0% and molybdenum of below 0.75%, besides stainless steel.

SUS420J2 is made by annealing at 800°–900° C., quenching at 920°–980° C. and tempering at 600°–750° C. and by including the chemical components of carbon of 0.26–0.40%, silicon of below 1.00%, manganese of below 1.00%, phosphorus of below 0.04%, sulphur of below 0.03%, nickel of below 0.60% and chromium of 12.0–14.0% besides stainless steel.

SUS304 is made by thermal treatment for solid solution at 1010°–1150° C. and by including the chemical components of carbon of below 0.15%, silicon of below 1.00%, manganese of below 2.00%, phosphorus of below 0.20%, sulphur of below 0.15%, nickel of 8.00–10.00%, chromium of 17.0–19.0% and molybdenum of below 0.60% besides stainless steel.

Although the present invention has been fully described by way of preferred embodiments thereof with reference to the accompanying drawings, various changes and modifications will be apparent to those having skill in this field without departing from the scope of the present invention, as defined by the appended claims.

What is claimed is:

1. A magnetic disk device comprising:

a center shaft;

an arm holder including a cylindrical member formed in a center portion thereof and arm members each connected at one end portion thereof to magnetic heads corresponding to respective magnetic disks and at another end portion to an outer peripheral side of said cylindrical member; and a bearing for rotatably supporting said arm holder around said center shaft, said bearing comprises:

inner race members which are in contact with balls of said bearing; and a cylindrical support member having grooves formed therein, said cylindrical support member being directly in contact with said balls, said cylindrical support member being fixed to said arm holder at both end portions of said cylindrical support member by a clamp ring with a predetermined gap formed between an outer peripheral surface of said cylindrical support member and an inner peripheral surface of said arm holder and being made of a material having a linear expansion coefficient which is substantially similar to that of a material of which said arm holder is made.

2. A magnetic disk device as claimed in claim 1, wherein said small gap ($\Delta d$) is defined by the following formula:

$$\Delta d = |\alpha 2 - \alpha 1| \times D \times \Delta T,$$

where the symbol | | defines the absolute value, D is a diameter of said cylindrical support member, said $\alpha 1$ is the linear expansion coefficient of said cylindrical support member, $\alpha 2$ is the linear expansion coefficient of said arm holder and $\Delta T$ is an amount of temperature change of said magnetic disk device including ambient temperature change.

3. The device as claimed in claim 1, wherein said cylindrical support member includes a flange member on which said arm holder is placed.

4. A magnetic disk device comprising:

an arm holder including a cylindrical member formed in a center portion thereof and arm members each connected at one end portion thereof to magnetic heads corresponding to respective magnetic disks and at another end portion to an outer peripheral side of said cylindrical member;

a center shaft provided with grooves formed in a peripheral surface thereof for directly coming into contact with balls; and a cylindrical support member with grooves which is directly in contact with said balls, said cylindrical support member being fixed to said arm holder at both end portions of said cylindrical support member by a clamp ring and being made of a material having a linear expansion coefficient substantially similar to that of a material said arm holder, wherein said grooves, said balls and said cylindrical support member constitute a bearing.

* * * * *